(12) United States Patent
Tsuji

(10) Patent No.: US 8,046,710 B2
(45) Date of Patent: Oct. 25, 2011

(54) WEATHER INFORMATION DISPLAY DEVICE WITH DISPLAY ICON

(75) Inventor: Kenji Tsuji, Gifu (JP)

(73) Assignee: DENSO CORPORATION, Kariya (JP)

( * ) Notice: Subject to any disclaimer, the term of this patent is extended or adjusted under 35 U.S.C. 154(b) by 517 days.

(21) Appl. No.: 12/230,966

(22) Filed: Sep. 9, 2008

(65) Prior Publication Data

US 2009/0083657 A1     Mar. 26, 2009

(30) Foreign Application Priority Data

Sep. 20, 2007   (JP) ................................. 2007-243827

(51) Int. Cl.
*G06F 3/048* (2006.01)
(52) U.S. Cl. ............ 715/781; 706/47; 706/48; 382/205
(58) Field of Classification Search .................. 715/781; 709/743, 748, 780; 706/47, 48; 382/205, 382/225, 226
See application file for complete search history.

(56) References Cited

U.S. PATENT DOCUMENTS

| | | | |
|---|---|---|---|
| 5,644,661 A * | 7/1997 | Smith et al. | 382/300 |
| 5,796,868 A * | 8/1998 | Dutta-Choudhury | 382/199 |
| 6,381,358 B1 * | 4/2002 | Vacca et al. | 382/145 |
| 2006/0002603 A1 * | 1/2006 | Beauchaine et al. | 382/141 |
| 2006/0022846 A1 * | 2/2006 | Tummala | 340/995.1 |
| 2006/0114512 A1 * | 6/2006 | Von Wechgeln et al. | 358/3.06 |

FOREIGN PATENT DOCUMENTS

| | | |
|---|---|---|
| JP | A-9-330024 | 12/1997 |
| JP | A-2000-258174 | 9/2000 |
| JP | A-2003-148976 | 5/2003 |
| JP | A-2004-126338 | 4/2004 |

* cited by examiner

*Primary Examiner* — Boris Pesin
*Assistant Examiner* — Matthew Ell
(74) *Attorney, Agent, or Firm* — Posz Law Group, PLC

(57) ABSTRACT

A rectangular area containing sections corresponding to same weather information is set. If sections at four corners of the set area are sections corresponding to the same weather information, a numerical value "1" is set as a weighting score to the sections. If not so, a numerical value "0" is set to the sections. Sections to which no weighting score is allocated and which are adjacent to sections to which weighting scores have been allocated are successively selected from the outer edge side, and the maximum value of the weighting scores of the four sections adjacent to each selected section is set as a weighting score of the selected section. If the previously selected section is a section corresponding to the weather information, the numerical value "1" is added to the weighting score of the section. The section having the highest weighting score is selected as a specific section, and an icon is displayed on the specific section.

7 Claims, 10 Drawing Sheets

| DISPLAY PRIORITY | WEATHER INFORMATION TYPE | DISPLAY MODE |
|---|---|---|
| 1 | A | a |
| 2 | B | b |
| 3 | C | c |
| 4 | D | d |
| 5 | E | e |
| 6 | F | f |
| 7 | G | g |
| ... | ... | ... |

FIG. 5A
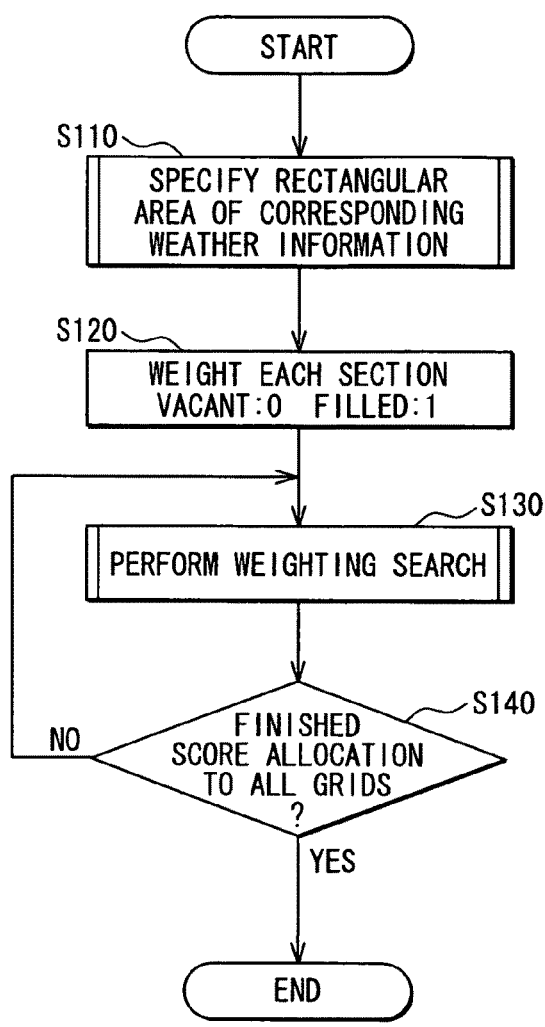
FIG. 5B
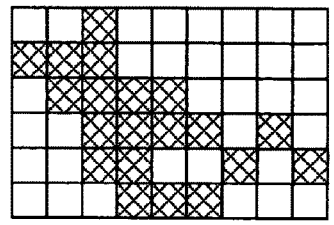
FIG. 5C
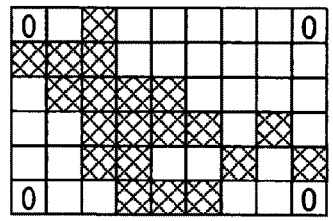
FIG. 5D
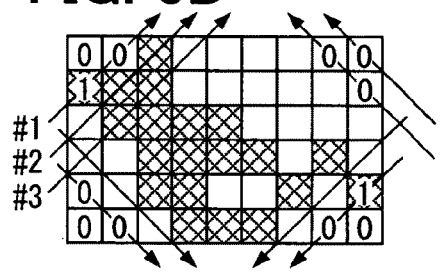
FIG. 5E
| 0 | 0 | 1 | 1 | 1 | 0 | 0 | 0 | 0 |
|---|---|---|---|---|---|---|---|---|
| 1 | 2 | 3 | 3 | 3 | 0 | 0 | 0 | 0 |
| 1 | 3 | 4 | 5 | 6 | 3 | 2 | 0 | 0 |
| 0 | 3 | 4 | 6 | 7 | 3 | 2 | 2 | 1 |
| 0 | 0 | 1 | 2 | 3 | 1 | 2 | 1 | 1 |
| 0 | 0 | 0 | 1 | 2 | 1 | 0 | 0 | 0 |
GRID OF MAXIMUM SCORE

WEATHER INFORMATION DISPLAY DEVICE WITH DISPLAY ICON

CROSS REFERENCE TO RELATED APPLICATION

This application is based on and incorporates herein by reference whole contents of Japanese Patent Application No. 2007-243827 filed on Sep. 20, 2007.

FIELD OF THE INVENTION

The present invention relates to a weather information display device for displaying weather information while superposing the weather information on a map.

BACKGROUND OF THE INVENTION

Conventional navigation systems have a function of searching a route to a destination and guiding the searched route to a user. The navigation systems also have a function of detecting the position of a vehicle (subject vehicle) to draw a map data around the position of the subject vehicle on a display, displaying a mark of the subject vehicle on the displayed map data, and scrolling the map in conformity with variation of the position of the subject vehicle.

Furthermore, recent navigation systems are provided with a communication function of communicating with external servers and networks, a reproducing function of reproducing audio/video data of CD, DVD, etc., a receiving function of receiving television broadcast or radio broadcast, etc. Particularly by using the communication function, the user of the subject vehicle can acquire information on vehicular accidents and traffic jam occurring at the outside of the subject vehicle on a real-time basis, and acquire new map data, data of facilities, etc. from a map distribution server or the like, thereby enhancing the convenience for users.

A function of receiving weather information transmitted from an outside source to display rainfall information or fair weather information on the basis of the weather information or predict places at which traffic regulation or risks may occur, and searching a guide route to a destination while avoiding these places is known as an example of utilization of the communication function.

Map display devices in which the map data of a map is on a display while the map is scrolled on the display are known. In some of these display devices, an area name such as a prefecture name or the like is scrolled at a lower speed than a map scroll speed when a map is scrolled (for example, JP 2004-126338A). The position at which the area name is displayed is preset in the map data.

In some of these map display devices, even when only a part of a polygon is displayed on a display screen, the polygon name thereof is displayed on the display screen (for example, JP 09-330024A). Specifically, the map display device is provided with a road map data containing polygon data in which a polygon name "AB park" is registered for plural registered positions Pn, Pn1 to Pn11 in a polygon, a display area of a road map is set and a polygon contained in the road map is extracted. Then, the road map in the display area is displayed on the basis of the road map data, and the name of the extracted polygon (polygon name) is displayed at any registered position contained in the display area.

In the above two devices, area names or polygon names can be displayed on the display screen while superposed on areas having fixed shapes such as administrative sections such as prefectural and city governments, parks, etc. However, it is difficult to display names or icons on the display screen while the names or the icons are superposed on areas whose shapes are fluctuating (variable) like weather phenomena, etc. For example, when the shape of an area representing weather information has an out-of-area portion at the inside thereof like a donut shape or the like, the name or icon of the area concerned may be erroneously displayed on the out-of-area portion. In this case, the out-of-area portion may be misidentified as the area representing the weather information concerned.

SUMMARY OF THE INVENTION

It is therefore an object of the present invention to provide a weather information display device, which displays icons, etc. in an area whose shape is variable so that the icons, etc. are superposed at positions which users can easily grasp.

According to one aspect of the present invention, a weather information display device comprises a map information acquiring unit, a weather information acquiring unit, a display unit and a display control unit. The map information acquiring unit acquires map information. The weather information acquiring unit acquires weather information which is set in connection with a unit of rectangular section on a map. The display unit displays various information for a user. The display control unit displays a map on the display unit on the basis of the map information acquired by the map information acquiring unit. The display control unit further controls a display mode of sections displayed on the map so that a section corresponding to the weather information acquired by the weather information acquiring unit on the displayed map is distinguishable from other sections. The display control unit is configured to select, from the sections corresponding to the weather information acquired by the weather information acquiring unit, a section on which an icon representing a type of the weather information is superposed and displayed by executing a group of following steps 1 to 4, and display the icon on the selected section.

step 1: setting a substantially rectangular area containing sections corresponding to same weather information;

step 2: setting a numerical value "1" as a weighting score to a section at each of four corners of the set area when the section concerned is a section corresponding to the same weather information, and setting a numerical value "0" as a weighting score to a section at each of four corners of the set area when the section concerned is not a section corresponding to the same weather information;

step 3: successively selecting, from an outer edge side of the set area, sections to which no weighting score is set and which are adjacent to sections to which weighting scores have been already set, setting the maximum value of the weighting scores set in four sections adjacent to each of the selected sections as the weighting score of the selected section, and setting a numerical value "0" as a weighting score to the selected section when no weighting score is set to the four sections adjacent to the selected section;

step 4: adding a numerical value "1" as a weighting score to the section selected in the step 3 when the section selected in the step 3 is also a section corresponding to the same weather information; and step 5: returning to the step 3 when no weighting score is allocated to all the sections in the set area, and selecting as a specific section a section having the highest weighting score among the sections in the set area when weighting scores are allocated to all the sections in the set area.

BRIEF DESCRIPTION OF THE DRAWINGS

The above and other objects, features and advantages of the present invention will become more apparent from the following detailed description made with reference to the accompanying drawings. In the drawings:

FIG. 5A is a flowchart showing icon display grid determining processing, FIG. 5B is an explanatory view (1) showing the icon display grid determining processing, FIG. 5C is an explanatory view (2) showing the icon display grid determining processing, FIG. 5D is an explanatory view (3) showing the icon display grid determining processing, and FIG. 5E is an explanatory view (4) showing the icon display grid determining processing;

DETAILED DESCRIPTION OF PREFERRED EMBODIMENTS

First Embodiment

Figure 1:
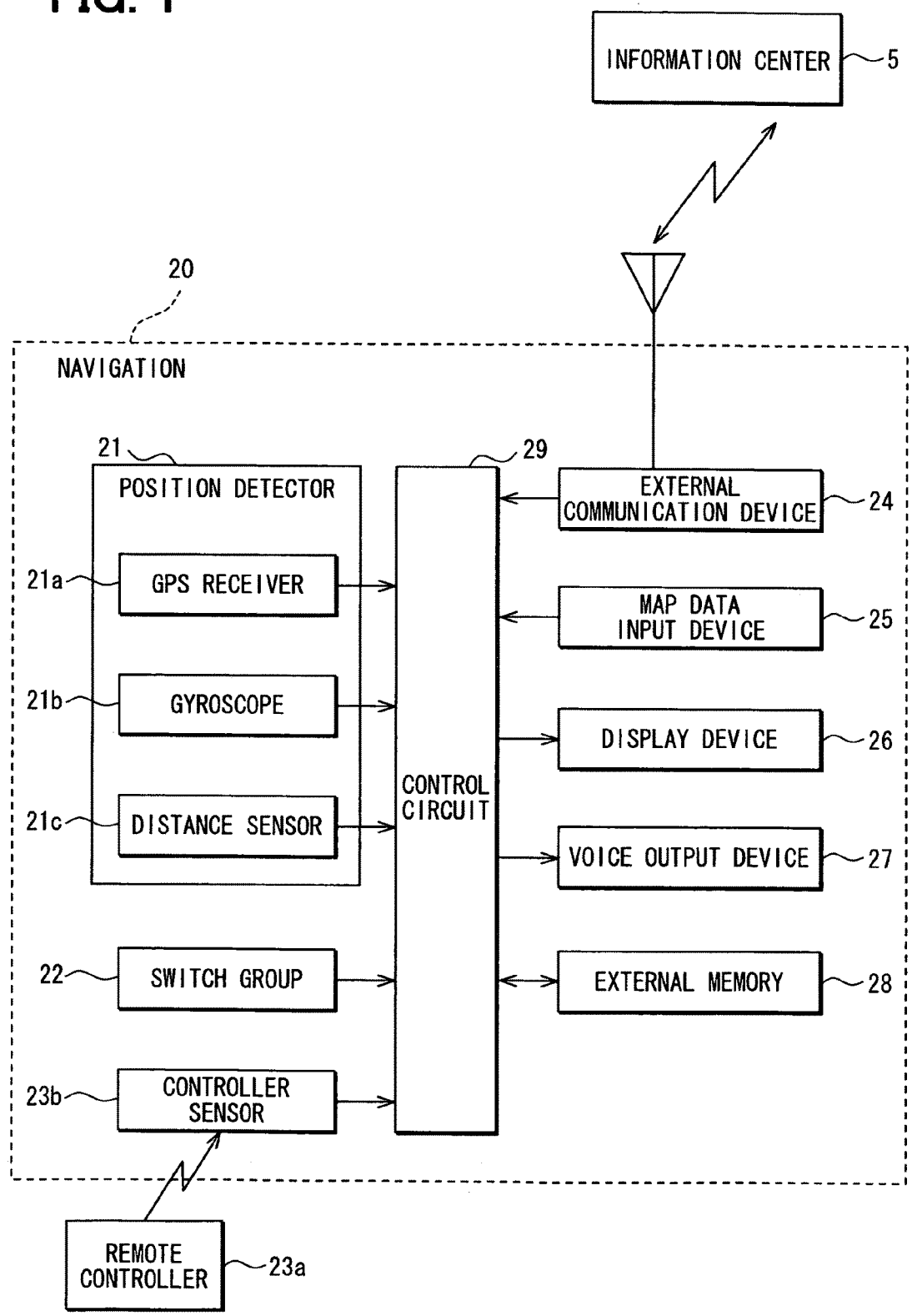
FIG. 1 is a block diagram showing a navigation device including a weather information display device according to a first embodiment of the present invention.
Figure 2:
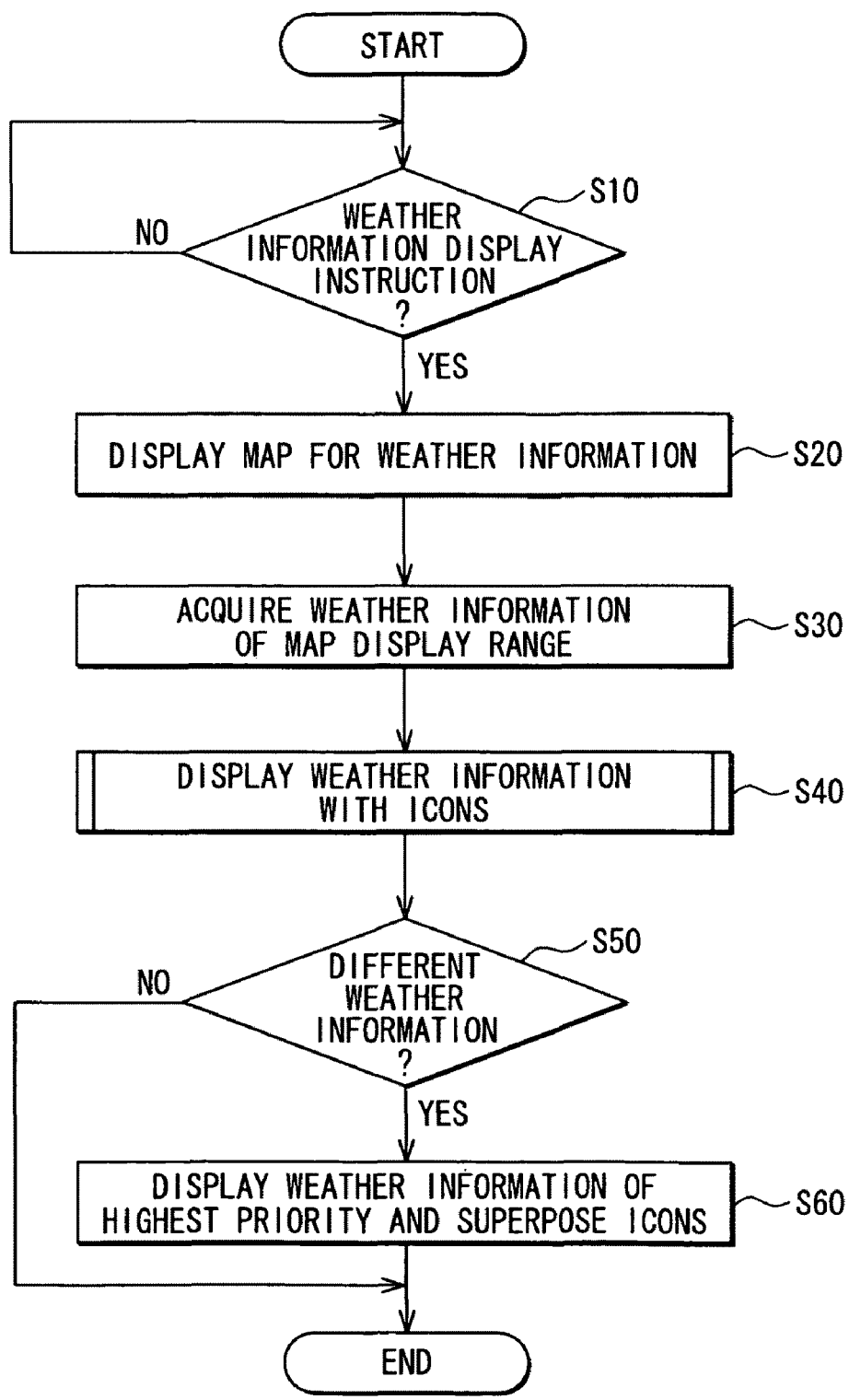
FIG. 2 is a flowchart showing weather information display processing executed in the first embodiment.

Referring first to FIG. 1, a navigation device 20, which operates also as a weather information display device, is shown with an information center 5.

The navigation device 20 is mounted in a vehicle, and equipped with a position detector 21 for detecting the position, speed, travel direction, etc. of the vehicle, an operation switch group 22 for inputting various kinds of instructions from a user, a remote controller 23a which can input various kinds of instructions like the operation switch group 22, a remote controller sensor 23b to which a signal from the remote controller 23a is input, an external communication device 24 for communicating with the external information center 5, a map data input unit 25 for inputting map data, etc. from an external recording medium in which map data and various kinds of information are recorded, a display device 26 for performing various kinds of displays such as map display, etc., a voice output device 27 for outputting various kinds of guide voices, etc., a control unit 29 and an external memory 28 which is connected to the control unit 20 and stores various kinds of information.

The position detector 21 includes a GPS receiver 21a for receiving transmission electric waves from artificial satellites for global positioning system (GPS) through a GPS antenna to detect the position, speed, travel direction, etc. of the vehicle, a gyroscope 21b for detecting the magnitude of a rotational motion applied to the vehicle, and a distance sensor 21c for detecting the travel distance of the vehicle. These sensors, etc. 21a to 21c have errors having different properties, and thus they are constructed and used so as to mutually complement one another. In accordance with the precision, the position detector 21 may include only some of these sensors, or the position detector 21 may further include in addition a rotational sensor for a steering, a wheel sensor for each rolling wheel, etc.

A touch panel which is constructed integrally with the display device 26 and mounted on the display screen, mechanical key switches provided around the display device 26, etc. are used as the operation switch group 22. The touch panel and the display device 26 are integrally stacked, and various types such as a pressure sensitive type, an electromagnetic induction type, an electrostatic capacity type or a combination type thereof are used for the touch panel.

The external communication device 24 performs information communication with the external information center 5 to receive weather information which is distributed from the information center 5 with FM multiple broadcasting, electric waves/optical beacon or the like. The external communication device 24 may be designed so as to receive weather information through a telephone line network such as the Internet or the like from the information center 5. The external communication device 24 corresponds to a weather information acquiring unit.

The map data input unit 25 is a device for inputting various kinds of data stored in a map data storage medium (for example, a hard disc, DVD-ROM or the like). Map data (node data, link data, cost data, background data, road data, name data, mark data, cross-point data, facilities data, etc.), voice data for guide, voice recognition data, etc. are stored in the map data storage medium. In place of input of these data from the map data storage medium, these data may be input through a communication network from an external site. The map data input unit 25 corresponds to a map information acquiring unit.

Figures 3A, 3B:
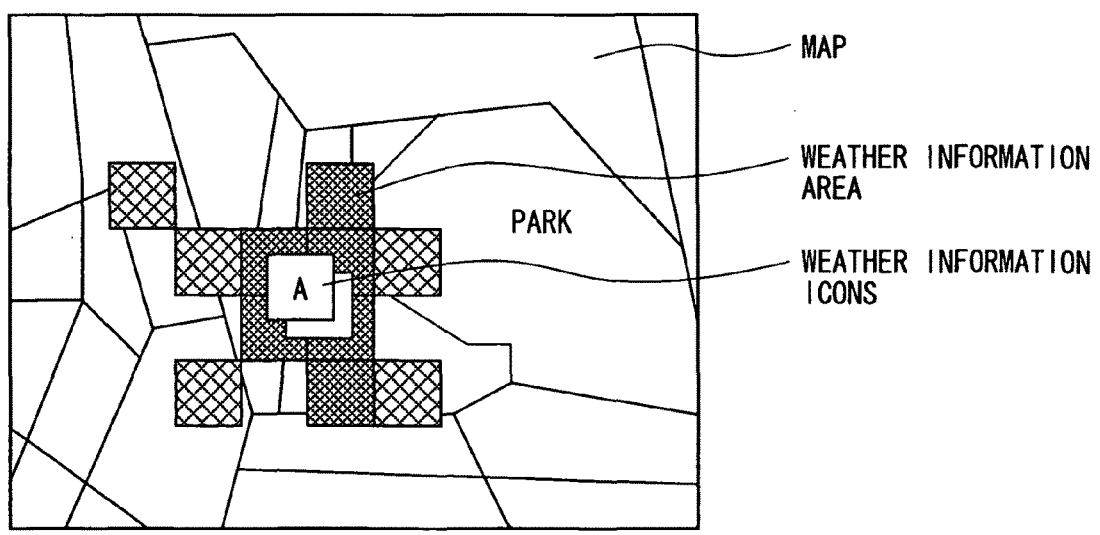
FIG. 3A is a table showing the corresponding relation of the type of weather information, priority and display mode.
FIG. 3B is a view showing a display example of the weather information.

The display device 26 is a color display device, and any one of a liquid crystal display, a plasma display, CRT, etc. may be used. On the display screen of the display device 26 may be displayed a mark representing the present place which is specified from the present position of the vehicle detected by the position detector 21 and map data input from the map data input unit 25, a guide route to a destination and additive data such as names, markers, symbol marks of various kinds of facilities, etc. while these data are superposed on one another. Furthermore, in order to display sections corresponding to weather information set in connection with a predetermined section unit on a map so that the sections concerned are discriminable from other sections, the sections concerned may be displayed while the display mode of the sections concerned on the map is changed (FIG. 3B). The display device 26 corresponds to a display unit.

The voice output device 27 may output voices for various kinds of guides such as a travel guide, etc.

The control unit 29 is mainly constructed with a well-known microcomputer including CPU, ROM, RAM, I/O, a bus line connecting these constituent elements to one another, etc. The control unit 29 executes various kinds of processing in accordance with inputs from the position detector 21, the operation switch group 22, the remote control sensor 23b, the external communication device 24 and the map data input unit 25 and controls the external communication device 24, the display device 26 and the voice output device 27. The control unit 29 executes various kinds of processing according to programs stored in ROM, etc. by using data in the external memory 28 as occasion demands.

For example, map display processing, route guide processing, etc. are provided at the processing associated with the navigation. The map display processing is the processing of calculating the present position of the vehicle as a pair of the coordinate and the travel direction on the basis of each detection signal from the position detector 21, and displaying on the display device 26 a map in the neighborhood of the present position of the vehicle, etc. which are read out through the map data input unit 25. The route guide processing is the processing of calculating the optimum road from the present position to a destination on the basis of map data stored in the map data input unit 25 and the destination which is set according to the operation of the operation switch 22, the remote controller 23 or the like, and performing a travel guide concerning the calculated route. A method of cost calculation based on Dijkstra method or the like is known as the method of automatically setting the optimum route as described above.

The control unit 29 also executes display processing of weather information in addition to or in parallel manner to the map display processing, the route guide processing, etc. described above. The details of this processing will be described in detail later. The control unit 29 corresponds to a display control unit.

As described above, the navigation device 20 acquires weather information from the information center 5 through the external communication device 24.

The information center 5 is connected through a communication line to a wireless base station which can communicate with each vehicle. The information center 5 wirelessly communicates with the navigation device 20 through the wireless base station, and transmits weather information to the navigation device 20. Specifically, the information center 5 has a weather information database for storing weather information to be transmitted to the navigation device 20, a line terminal device for performing communications through the communication line (both are not shown), a server for managing data (not shown), etc.

The weather information database stores weather information of a relatively broad area accumulated on the basis of information which is collected from an organization for supplying observation information of weather or the like as needed. This weather information is accumulated in association with a predetermined section unit on the map. This predetermined section may be a section based on a grid section on the basis of the latitude and longitude, or a section divided by administrative boundaries. In this embodiment, as shown in FIG. 3B, the grid-based section divided by the latitude and longitude is used. The predetermined section is represented by "section" or "grid" appropriately. Furthermore, the weather information accumulated in the weather information database contains weather alarm (tornado, flood, etc.), present state information/forecast information (fair, rain, thunder, storm, etc.), road information (freeze, overhead flooding, etc.). Tornado, thunder showers, typhoon, rain, fog, sleet, snow, hail, etc. are contained.

Next, the display processing of the weather information executed in the control unit 29 of the navigation device 20 will be described with reference to the flowchart of FIG. 2 and FIGS. 3A, 3B and 4A to 4D.

First, it is checked in S10 whether an instruction for starting the weather information display processing is input from a user through the operation switch group 22 or the remote controller 23a. If this display instruction is input (S10: YES), the processing proceeds to S20.

In S20, a map for displaying weather information is displayed. For example, this map may have a predetermined range containing the position of the subject vehicle at the center thereof or a map having a predetermined range indicated by the user. Furthermore, the weather information display map is a specialized map for displaying only weather information, and thus guide route, peripheral facilities information, landmarks, etc. in a route guide are not displayed on this map.

Subsequently, weather information corresponding to the map display range displayed in S20 is acquired. Various methods may be considered to acquire the weather information. Here, the following three methods will be described.

(1) When weather information is transmitted in a broadcasting style such as an FM multiple broadcasting style, an artificial satellite radio broadcasting style, a digital radio broadcasting style or the like, the navigation device 20 receives and stores the weather information in the external memory 28, and updates and renews the weather information stored in the external memory 28 every time new transmitted weather information is received. In the processing of S20, the weather information corresponding to the map display range is acquired from the weather information stored in the external memory 28.

(2) For example, the navigation device 20 first communicates with the information center 5 through the external communication device 24 to request transmission of weather information accumulated in the information center 5 after starting the processing of S30, receives the weather information transmitted from the information center 5 in response to the above request and stores the received weather information into the external memory 28. Thereafter, the weather information corresponding to the map display range is acquired from the weather information stored in the external memory 28.

At this time, in response to the request from the navigation device 20, the information center 5 transmits the present-time weather information accumulated in the weather information database to the navigation device 20.

(3) In the examples of (1) and (2), the weather information corresponding to the map display range is extracted at the navigation device 20 side. However, the information center 5 may be made to execute the extraction work itself. In this case, the navigation device 20 communicates with the information center 5 through the external communication device 24 to transmit the map display range to the information center 5, and also request the information center 5 to transmit the weather information corresponding to the map display range. Thereafter, the navigation device 20 receives the weather information which is transmitted from the information center 5 in response to this request.

At this time, in response to the request from the navigation device 20, the information center 5 extracts the weather information corresponding to the map display range transmitted from the navigation device 20 from the present-time weather information accumulated in the weather information database, and then transmits the extracted weather information to the navigation device 20.

If the weather information is acquired in S30, the processing proceeds to S40. In S40, the acquired weather information is displayed together with icons.

FIG. 3A shows a table indicating the corresponding relation of the type of weather information, display priority and display mode. This relation is stored in the external memory 28, for example. In this corresponding-relation table, the weather information types A, B, C, . . . are set in connection with display priorities 1, 2, 3, . . . , and further display modes a, b, c, . . . are also set. This display mode represents a color or a texture pattern, for example. The difference in weather information can be discriminated by the difference in the color or the texture pattern.

An area representing weather information is set as follows. That is, grids which share apexes (square corner points) and have the same type of corresponding weather information are assumed as belonging to the same area as exemplified in FIG. 4A. Furthermore, grids which share apexes are assumed as belonging to the same area as exemplified in FIGS. 4B and 4C. Furthermore, grids which do not share any apex are assumed not to belong to the same area as exemplified in FIG. 4D. Still furthermore, grids having different types of corresponding weather information are assumed not to belong to the same area as exemplified in FIG. 4E.

In S40, the corresponding relation table is referred to, and the corresponding section of the weather information is displayed in the display mode corresponding to the weather information. It is considered that a character or mark representing the weather information may be used as the icon representing the weather information. For example, characters "tornado" may be displayed, or a mark imaging a tornado may be displayed. The "icon display grid determination processing" as the processing of displaying an icon at the corresponding section of the weather information will be described later.

In subsequent S50, it is checked whether different weather information occur in the same section. Specifically, it is checked whether at least parts of the areas of plural kinds of weather information are overlapped with one another. If the different weather information occur in the same section (S50: YES), the display mode of the overlapped section is set to the display mode corresponding to the weather information having the highest display priority, and also icons are superposed (S60).

Figure 4A:
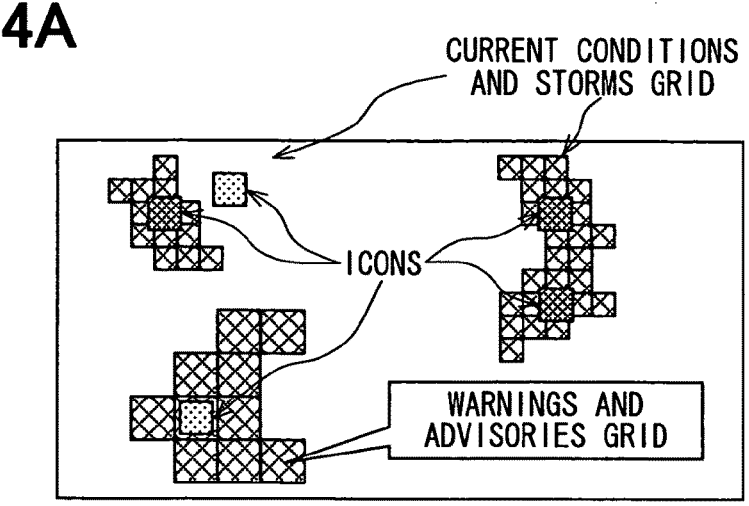
FIG. 4A is an explanatory view (1) showing weather information display processing.
Figure 4B:
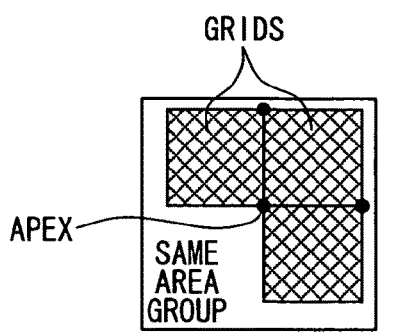
FIG. 4B is an explanatory view (2) showing the weather information display processing.
Figure 4C:
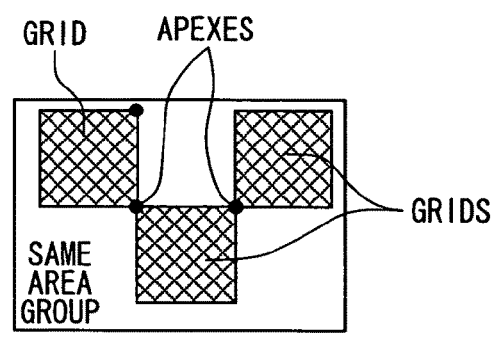
FIG. 4C is an explanatory view (3) showing the weather information display processing.
Figure 4D:
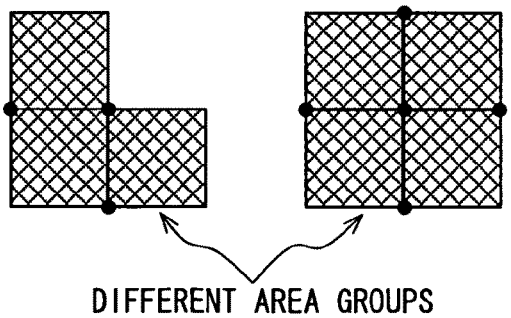
FIG. 4D is an explanatory view (4) showing the weather information display processing.
Figure 4E:
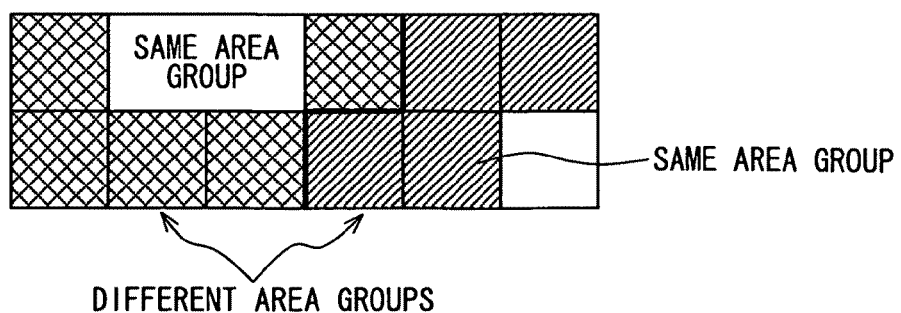
FIG. 4E is an explanatory view (5) showing the weather information display processing.

In S60, the corresponding relation table shown in FIG. 3A is referred to, the display priorities of the respective weather information in the overlapped section are compared with one another, and the display mode corresponding to the weather information having the highest display priority is set. For example, when weather information A and weather information B occur in the same section, the display mode of the weather information A is set for the overlapped section, and the icon of the weather information A and the icon of the weather information B are displayed while the icon of the weather information A is superposed on the icon of the weather information B so as to be displaced from each other by a predetermined amount. FIG. 4B shows an example of the above state. When the overlap of icons occurs, the highest priority is given to the icon located at the upper left side, and the lower priority icon is not displayed. With respect to the icon at the left side and the icon at the upper side, the upper icon is preferential to the lower icon. After the processing of S60, the initial display processing is finished.

On the other hand, if plural kinds of weather information do not occur in the same section (S50: NO), this processing is finished without executing the processing of S60.

Next, the icon display grid determination processing as a subroutine of the weather information display processing will be described with reference to FIGS. 5A to 5E.

FIG. 5A is a flowchart showing the procedure of the icon display grid determination processing, and FIGS. 5B to 5E are explanatory views showing the icon display grid determination processing. This processing is executed to display an icon in the corresponding section of weather information when the processing proceeds to S40 in the weather information display processing.

First, in S110, the maximum XY coordinates and the minimum XY coordinates are selected from the XY coordinates of the sections corresponding to the weather information, and a rectangular or square area containing all the sections corresponding to the weather information is specified from the selected maximum and minimum XY coordinates (FIG. 5B). With respect to sections which are overlapped with the sections corresponding to another type weather information and thus are not displayed, these sections are also targeted in this processing.

In S120, the sections of the rectangular area specified in S110 are successively weighted from the four apexes. Specifically, when the section at each of the four corners of the set area is also a section corresponding to the weather information (filled grid), a numerical value "1" is set as a weighting score to the section. On the other hand, when the section at each of the four corners of the set area is not a section corresponding to the weather information (vacant grid), a numerical value "0" is set as a weighting score to the section. In FIG. 5C, the cross-hatched section is the filled grid having the weather information and the blank section is the vacant grid having no weather information.

In S130, the sections are subjected to weighting search in the order of upper left, upper right, lower left and lower right (FIG. 5D). This search is performed for all grids, which are on each search line (arrow line in FIG. 5D.

Figure 6A:
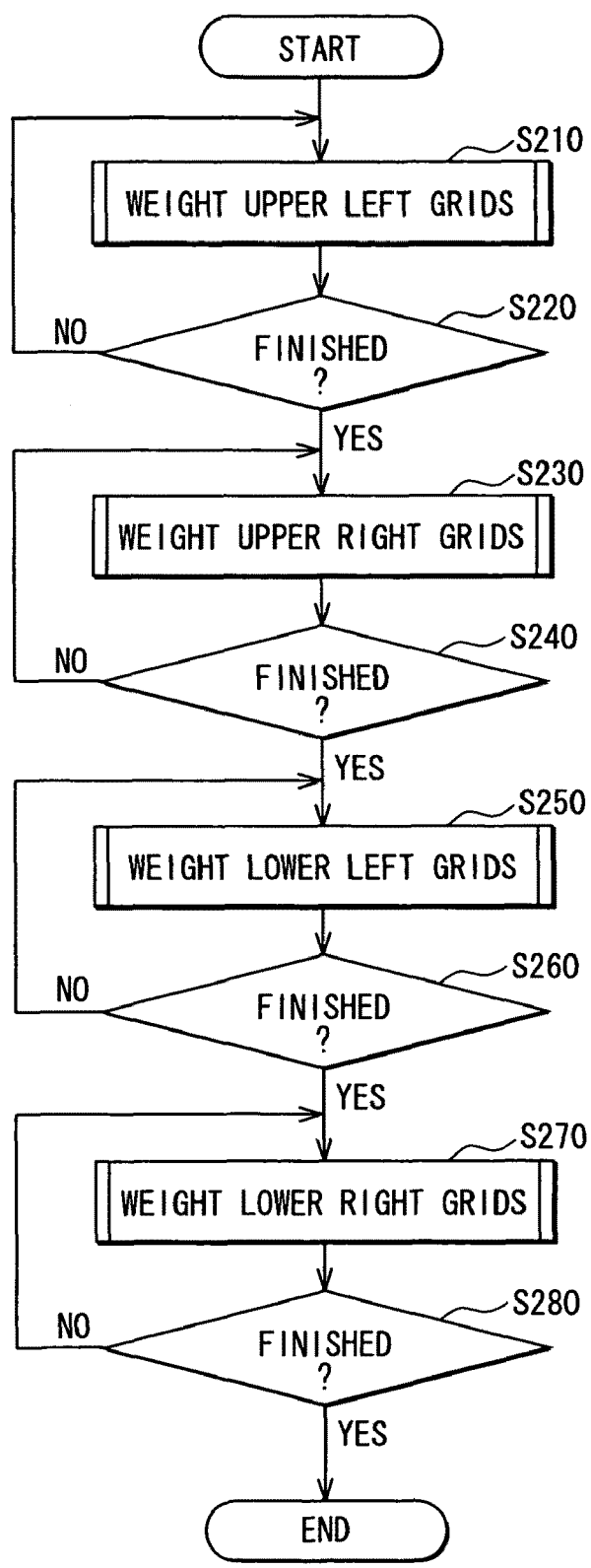
FIG. 6A is a flowchart showing weighting check processing.
Figure 6B:
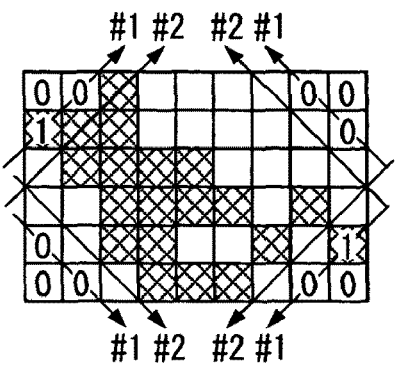
FIG. 6B is an explanatory view showing the weighting check processing.

FIG. 6A is a subroutine representing the weighting search processing. First, sections to which no weighting score is set and which are adjacent to sections to which weighting scores have been already set are successively selected from the outer edge side of the set area (FIG. 6B) as indicated by #1 (first cycle), #2 (second cycle) and so forth. The maximum value of the weighting scores set in four sections adjacent to each selected section is set as the weighting score of the selected section. At this time, sections of (N+1)-th are selected at the N-th cycle in the order of a section group (grids) near to the upper left corner of the set area (S210, S220), a section group near to the upper right corner of the set area (S230, S240), a section group near to the lower left corner of the set area (S250, S260) and a section group near to the lower right corner of the set area (S270, S280).

Figure 7A:
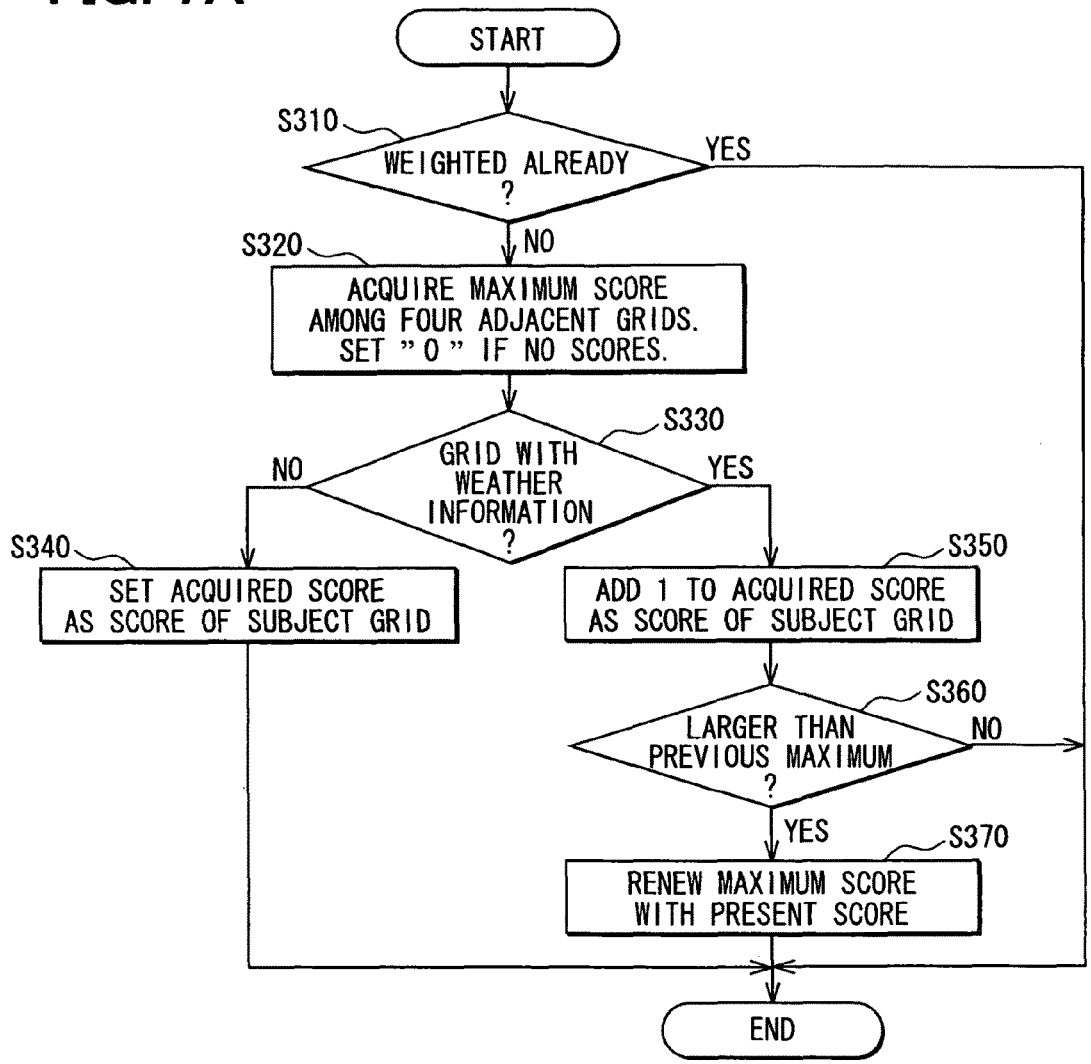
FIG. 7A is a flowchart showing weighting determination processing.

Weighting scores are allocated to the respective sections at S210, S230, S250, S270 as follows. FIG. 7A is subroutine representing the processing of allocating the weighting scores to the respective sections.

Figure 7B:
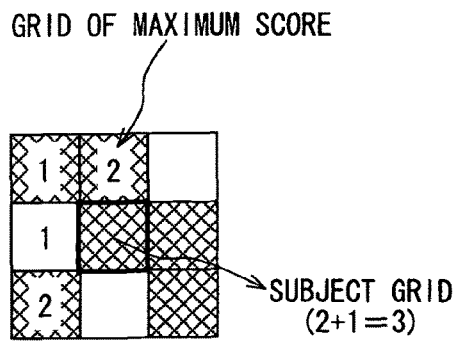
FIG. 7B is an explanatory view (1) showing the weighting determination processing.

First, it is checked at S310 whether a weighting score has been allocated. When the weighting score is allocated to a subject section, that is, already weighted (S310: YES), this subroutine is finished. On the other hand, if no weighting score is allocated to the subject section (S310: NO), the maximum value of the weighting scores allocated to the four sections adjacent to the subject section is acquired (S320). If no weighting score is allocated to the four sections adjacent to the subject section, the numerical value "0" is set to the subject section. Subsequently, when the subject section is not a section corresponding to the weather information (S330: NO), the weighting score of the subject section is maintained and not changed (S340). Thus this subroutine is finished without changing the weighting score of the subject section. On the other hand, if the subject section is also a section corresponding to the weather information (S330: YES), the numerical value "1" is added to the weighting score of the subject section (S350). For instance, as shown in FIG. 7B, since the upper adjacent grid has a score of 2 (maximum among the adjacent four grids), the subject grid results in having a score of 3 (=2+1). Furthermore, it is checked whether the value of the weighting score of the subject section is larger than the previously calculated maximum value of the weighting scores (S360). If it is determined that the value of the weighting score of the subject section is larger than the previously calculated maximum value of the weighting scores (S360: YES), the value of the weighting score of the subject section is stored in place of the previously calculated maximum value thus renewing the maximum value (S370), and this subroutine is finished. On the other hand, if the value of the weighting score of the subject section is not more than the previously calculated maximum value of the weighting scores (S360: NO), this subroutine is finished with no action.

Figure 7C:
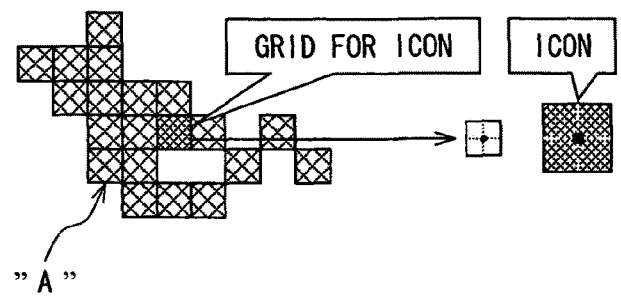
FIG. 7C is an explanatory view (2) showing the weighting determination processing.
Figure 11:
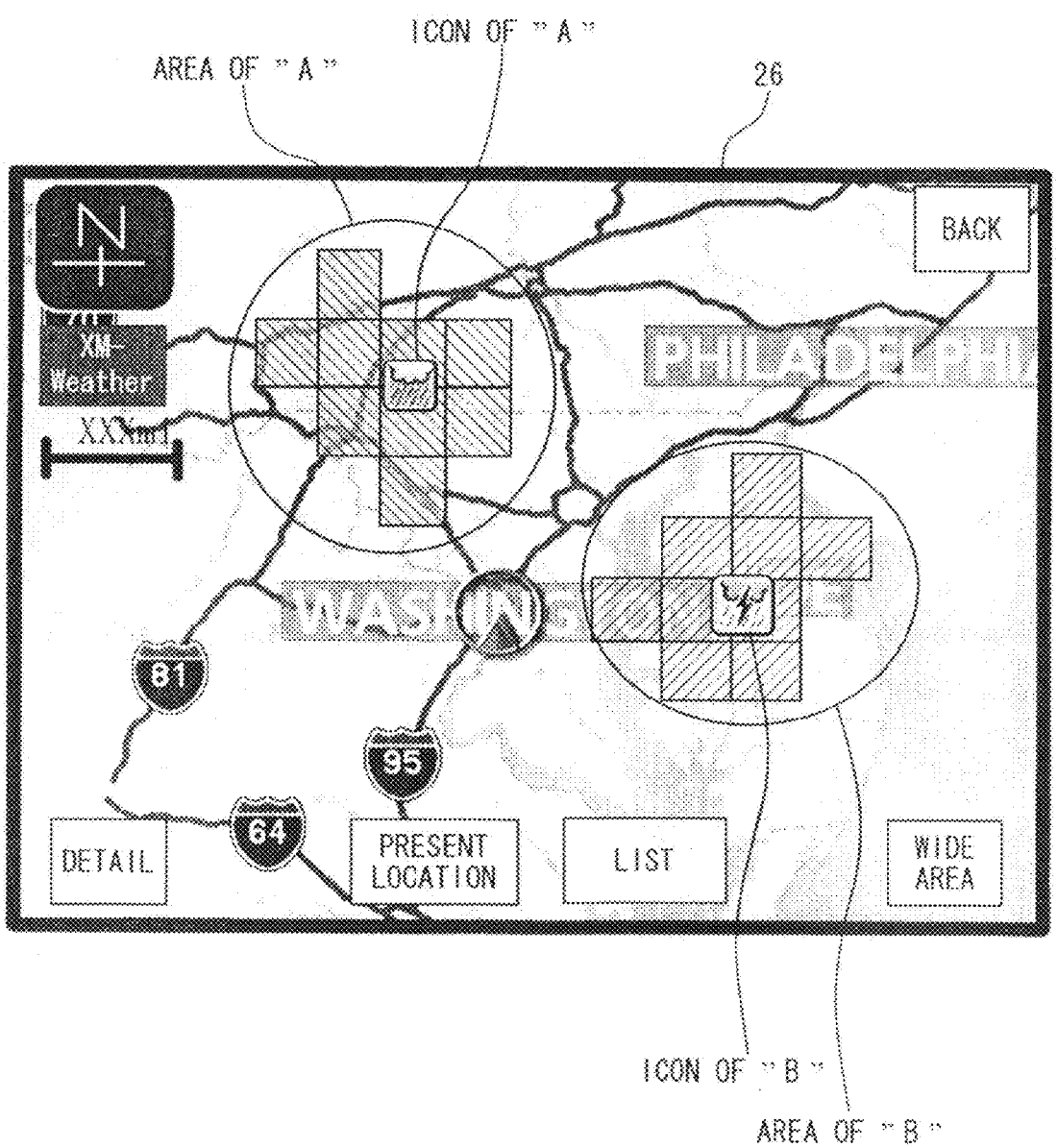
FIG. 11 is an explanatory view (6) showing the area check processing.

Referring back to FIG. 5A, it is checked in S140 whether weighting scores are allocated to all the sections in the area. The processing of checking whether the weighting scores are allocated to all the sections is executed when the processing of allocating the weighting scores to the section group near to the upper left corner of the set area is executed. If it is determined that the weighting scores are not allocated to all the sections (S140: NO), the processing returns to S130. On the other hand, if it is determined that the weighting scores are allocated to all the sections (S140: YES, FIG. 5E), the section having the highest weighting score out of the sections in the set area is selected as a specific section, and an icon is superposed on the selected section (FIG. 7C and FIG. 11).

Figure 8:
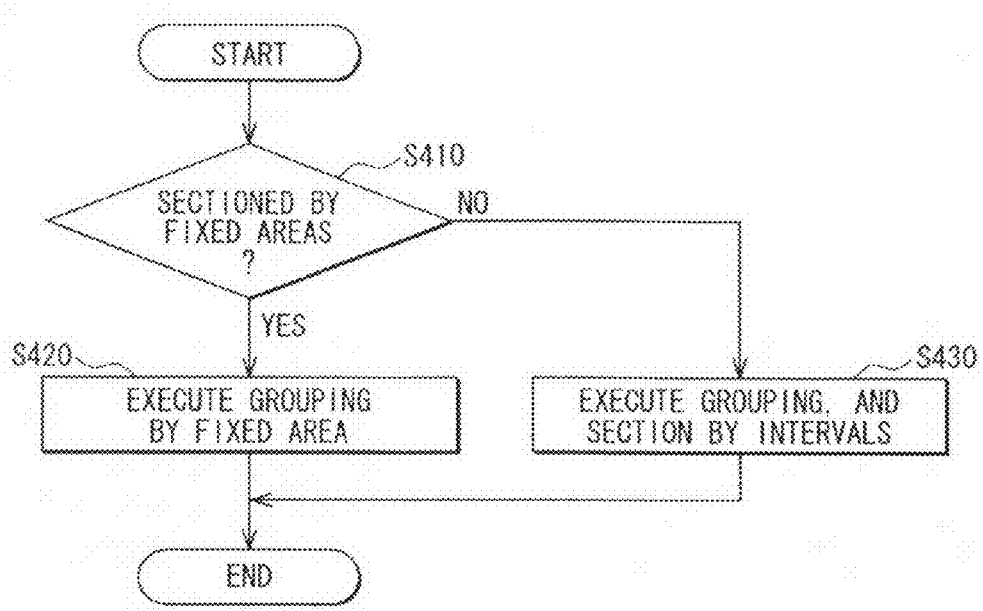
FIG. 8 is a flowchart showing area check processing.
Figure 9:
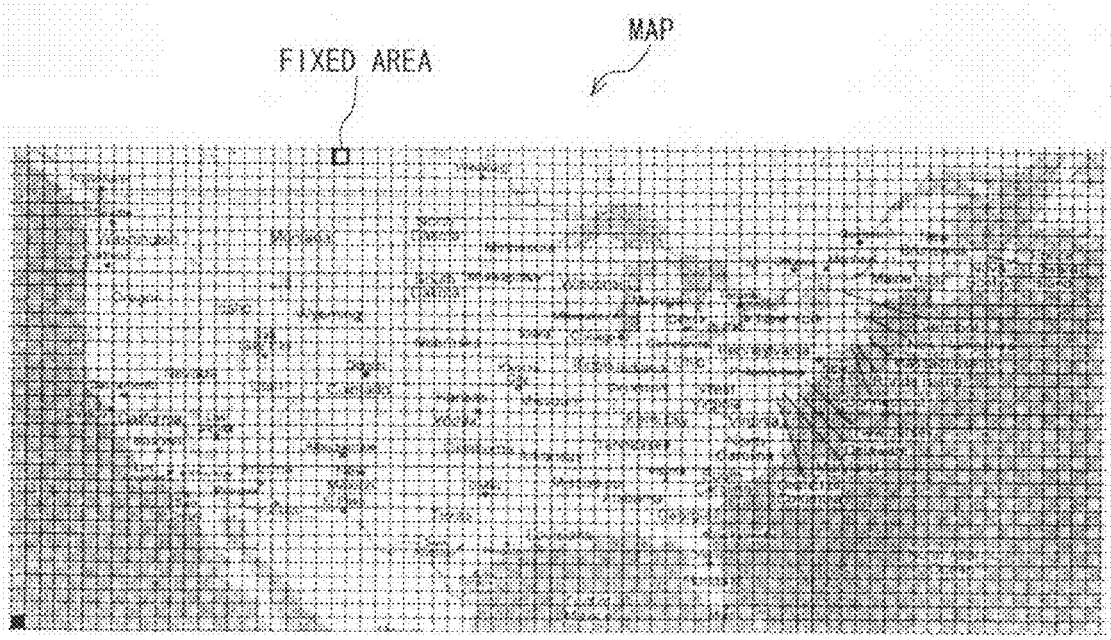
FIG. 9 is an explanatory view (1) showing the area check processing.

Next, the weather information area checking processing executed by the control unit 29 of the navigation device 20 will be described with reference to the flowchart of FIG. 8 and FIGS. 9 and 10. FIGS. 9 and 10A to 10D are explanatory views showing the area checking processing. This processing is executed before the icon display grid determination processing is executed when the processing proceeds to S40 (FIG. 2) in the weather information display processing.

First, it is checked on the basis of an instruction from the user through the operation switch group 22 or the remote controller 23a or a stored setting content whether a map is sectioned by fixed areas (S410). Here, the fixed area is an area partitioned by line segments along the latitude and longitude as shown in FIG. 9. If the map is sectioned by the fixed areas (S410: YES), the processing proceeds to S420. If the map is not sectioned by the fixed areas (S410: NO), the processing proceeds to S430.

Figure 10A:
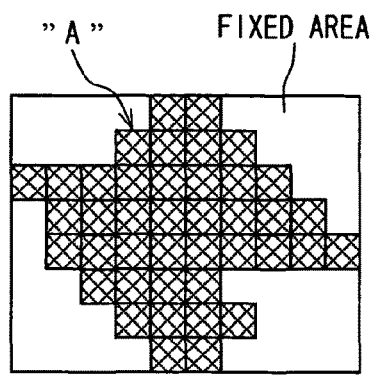
FIG. 10A is an explanatory view (2) showing the area check processing.
Figure 10B:
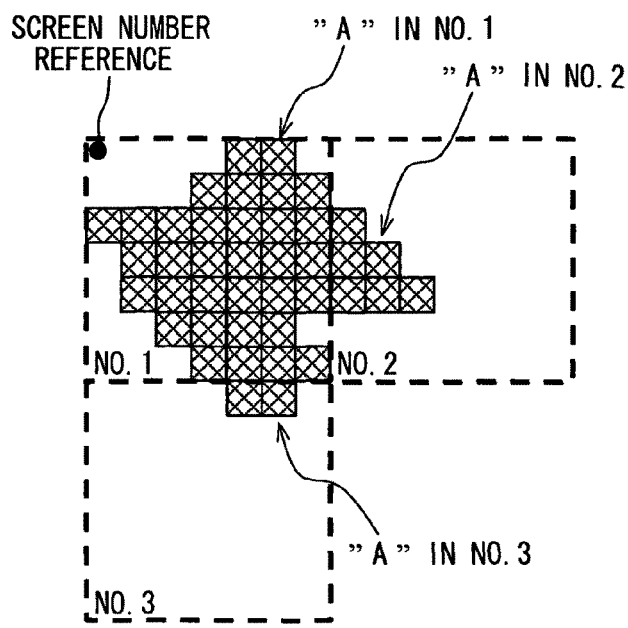
FIG. 10B is an explanatory view (3) showing the area check processing.

In S420, grouping is executed every fixed area. Specifically, a rectangular or square area containing all sections corresponding to weather information is specified as shown in FIG. 10A, while targeting the fixed area. The specified area is used in the icon display grid determination processing. Thereafter, this processing is finished.

Figure 10C:
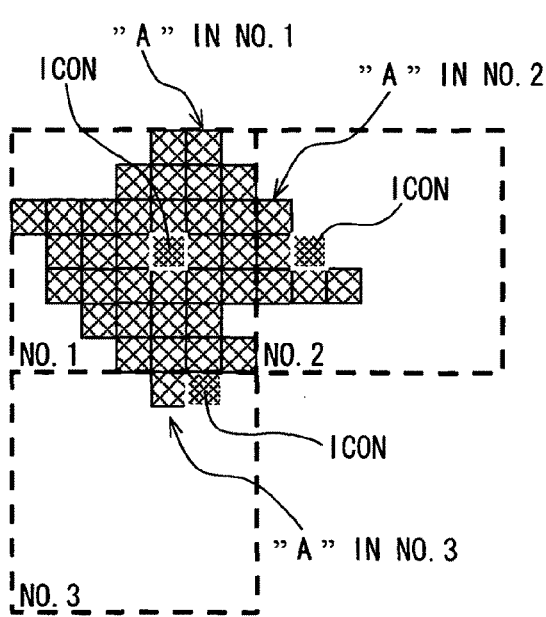
FIG. 10C is an explanatory view (4) showing the area check processing.
Figure 10D:
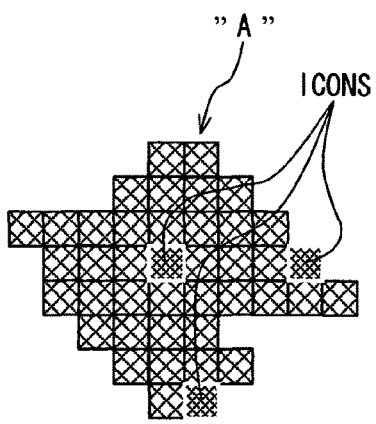
FIG. 10D is an explanatory view (5) showing the area check processing.

In S430, the icon display grid determination processing is executed while each display frame displayed on the display device 26 is targeted. Specifically, the map is sectioned by line segments located at predetermined intervals along the latitude and longitude so that the map can be displayed on the display device 26 (FIG. 10B), and the sectioned section is set as a display section or frame NO. 1 to NO. 3, each of which includes at least one fixed area of the weather information "A." A rectangular or square area containing all the sections corresponding to the weather information "A" is specified while each display section is targeted (FIG. 10C and FIG. 10D). The area specified here is used in the icon display grid determination processing. Thereafter, this processing is finished.

(1) According to the navigation device 20 of the first embodiment, the control unit 29 specifies a section which exists on a map and serves as the center of an area whose shape is variable, and displays an icon while superposing the icon on the specified section. Accordingly, when a map is displayed, an icon, etc. can be displayed at positions which a user can easily grasp. Furthermore, the user can easily know the type of weather information by merely viewing the icon and thus this is convenient to the user.

(2) Furthermore, according to the navigation device 20 of the first embodiment, in S130 of the weather information display processing, sections that are contained in sections to which no weighting score is allocated and are adjacent to sections to which weight scores are allocated are successively selected from the outer edge side of the set area (FIG. 6B), and the maximum value of the weighting scores set in the four sections adjacent to the selected section is set as the weighting score of the selected section. At this time, sections of (N+1)-th are selected at the N-th cycle in the order of a section group near to the upper left corner of the set area (S210, S220), a section group near to the upper right corner of the set area (S230, S240), a section group near to the lower left corner of the set area (S250, S260) and a section group near to the lower right corner of the set area (S270, S280). Accordingly, the weighting scores are set from the outer edge of the set area to the center thereof, so that the weighting scores at the center portion of the set area are liable to be relatively larger than the weighting scores at the peripheral portion of the set area, and thus the center portion of the set area is more liable to be set as a specific section than the peripheral portion of the set area.

(3) Still furthermore, according to the navigation device 20 of the first embodiment, in the weather information area checking processing, if the map is sectioned by the fixed areas (S410: YES), the rectangular or square area containing all the sections corresponding to the weather information is specified while the fixed area is targeted (S420). Accordingly, as compared with the case where a rectangular (square) area containing all the sections corresponding to the weather information is specified while each display frame displayed on the display device 26 is targeted, the processing load can be reduced.

(4) According to the navigation device 20 of the first embodiment, in the weather information area checking processing, if it is determined that the map is not sectioned by the fixed areas (S410: NO), a rectangular (square) area containing all the sections corresponding to the weather information is specified while each display frame displayed on the display device 26 is targeted (S430). Accordingly, in the case where the rectangular (square) area containing all the sections corresponding to the weather information is specified while the fixed area is targeted, when the set area cannot be displayed on one screen, the specific section may not be within the display screen and thus not be displayed. However, according to this method, the specific section can be surely displayed on the display screen.

Other Embodiments

The present invention is not limited to the above embodiment, and the present invention may be implemented as other embodiments as described below.

(1) In the first embodiment, in S130 of the weather information display processing, when the weighting scores are allocated, the section groups are successively selected in the order of the section group near to the upper let corner of the set area, the section group near to the upper right corner of the set area, the section group near to the lower left corner of the set area and the section group near to the lower right corner of the set area. However, the present invention is not limited to this style. For example, one of the four section groups may be selected, and the other section groups may be successively selected in a clockwise or counterclockwise order from the first selected section group. In this case, the same operation and advantage as the first embodiment can be attained.

What is claimed is:

1. A weather information display device comprising:
   a map information acquiring unit for acquiring map information;
   a weather information acquiring unit for acquiring weather information which is set in connection with a unit of rectangular section on a map;
   a display unit for displaying various information for a user; and
   a display control unit for displaying a map on the display unit on the basis of the map information acquired by the map information acquiring unit, and controlling a display mode of sections displayed on the map so that a section corresponding to the weather information acquired by the weather information acquiring unit on the displayed map is distinguishable from other sections,
   wherein the display control unit is configured to select, from the sections corresponding to the weather information acquired by the weather information acquiring unit, a section on which an icon representing a type of the weather information is superposed and displayed by executing a group of following steps, and display the icon on the selected section;
   step 1: setting a substantially rectangular area containing sections corresponding to same weather information;
   step 2: setting a numerical value "1" as a weighting score to a section at each of four corners of the set area when the section concerned is a section corresponding to the same weather information, and setting a numerical value "0" as a weighting score to a section at each of four corners of the set area when the section concerned is not a section corresponding to the same weather information;
   step 3: successively selecting, from an outer edge side of the set area, sections to which no weighting score is set and which are adjacent to sections to which weighting scores have been already set, setting the maximum value of the weighting scores set in four sections adjacent to each of the selected sections as the weighting score of the selected section, and setting a numerical value "0" as a weighting score to the selected section when no weighting score is set to the four sections adjacent to the selected section;
   step 4: adding a numerical value "1" as a weighting score to the section selected in the step 3 when the section selected in the step 3 is also a section corresponding to the same weather information; and
   step 5: returning to the step 3 when no weighting score is allocated to all the sections in the set area, and selecting as a specific section a section having the highest weighting score among the sections in the set area when weighting scores are allocated to all the sections in the set area.

2. The weather information display device according to claim 1, wherein:
   when in the step 3, sections to which no weighting score is set and which are adjacent to sections to which weighting scores have been allocated are successively selected from the outer edge side of the set area, the display control unit successively selects the sections in the order of a section group near to an upper left corner of the set area, a section group near to an upper right corner of the set area, a section group near to a lower left corner of the set area and a section group near to a lower right corner of the set area.

3. The weather information display device according to claim 1, wherein:
   when in the step 3, sections to which no weighting score is set and which are adjacent to sections to which weighting scores have been allocated are successively selected from the outer edge side of the set area, the display control unit selects one of a section group near to an upper left corner of the set area, a section group near to an upper right corner of the set area, a section group near to a lower left corner of the set area and a section group near to a lower right corner of the set area, and then successively selects the section groups in a clockwise or counterclockwise order from the selected group.

4. The weather information display device according to claim 1, wherein:
   the display control unit sets the rectangular area containing sections corresponding to the same weather information every fixed area preset on the map in the step 1.

5. The weather information display device according to claim 1, wherein:
   the display control unit sets the rectangular area containing sections corresponding to the same weather information from the map displayed on the display unit in the step 1.

6. A non-transitory computer-readable medium comprising instructions for execution by a computer, the instructions including a computer-implemented method for controlling a display unit, the instructions implementing:
   acquiring map information, in a map information acquiring unit;
   acquiring weather information which is set in connection with a unit of rectangular section on a map, in a weather information acquiring unit;
   displaying various information for a user, in a display unit;
   displaying a map on the display unit on the basis of the map information acquired by the map information acquiring unit, and controlling a display mode of sections displayed on the map so that a section corresponding to the weather information acquired by the weather information acquiring unit on the displayed map is distinguishable from other sections: and
   selecting, from the sections corresponding to the weather information acquired by the weather information acquiring unit, a section on which an icon representing a type of the weather information is superposed and displayed by executing a group of following steps, and displaying the icon on the selected section;
   step 1: setting a substantially rectangular area containing sections corresponding to same weather information;
   step 2: setting a numerical value "1" as a weighting score to a section at each of four corners of the set area when the section concerned is a section corresponding to the same weather information, and setting a numerical value "0" as a weighting score to a section at each of four corners of the set area when the section concerned is not a section corresponding to the same weather information;

step 3: successively selecting, from an outer edge side of the set area, sections to which no weighting score is set and which are adjacent to sections to which weighting scores have been already set, setting the maximum value of the weighting scores set in four sections adjacent to each of the selected sections as the weighting score of the selected section, and setting a numerical value "0" as a weighting score to the selected section when no weighting score is set to the four sections adjacent to the selected section;

step 4: adding a numerical value "1" as a weighting score to the section selected in the step 3 when the section selected in the step 3 is also a section corresponding to the same weather information; and step 5: returning to the step 3 when no weighting score is allocated to all the sections in the set area, and selecting as a specific section a section having the highest weighting score among the sections in the set area when weighting scores are allocated to all the sections in the set area.

7. A method for controlling a display unit, comprising:

displaying, from a weather information display device, a map on a display unit, and controlling, in the weather information display device, a display mode of sections displayed on the map so that a section corresponding to weather information on the displayed map is distinguishable from other sections; and selecting, from the sections corresponding to the weather information, a section on which an icon representing a type of the weather information is superposed and displayed by executing a group of following steps, and displaying the icon on the selected section;

step 1: setting a substantially rectangular area containing sections corresponding to same weather information;

step 2: setting a numerical value "1" as a weighting score to a section at each of four corners of the set area when the section concerned is a section corresponding to the same weather information, and setting a numerical value "0" as a weighting score to a section at each of four corners of the set area when the section concerned is not a section corresponding to the same weather information;

step 3: successively selecting, from an outer edge side of the set area, sections to which no weighting score is set and which are adjacent to sections to which weighting scores have been already set, setting the maximum value of the weighting scores set in four sections adjacent to each of the selected sections as the weighting score of the selected section, and setting a numerical value "0" as a weighting score to the selected section when no weighting score is set to the four sections adjacent to the selected section;

step 4: adding a numerical value "1" as a weighting score to the section selected in the step 3 when the section selected in the step 3 is also a section corresponding to the same weather information; and step 5: returning to the step 3 when no weighting score is allocated to all the sections in the set area, and selecting as a specific section a section having the highest weighting score among the sections in the set area when weighting scores are allocated to all the sections in the set area.

* * * * *